(12) United States Patent
Depondt et al.

(10) Patent No.: US 11,904,815 B1
(45) Date of Patent: Feb. 20, 2024

(54) WIPER BLADE, IN PARTICULAR FOR A MOTOR VEHICLE

(71) Applicant: Robert Bosch GmbH, Stuttgart (DE)

(72) Inventors: Helmut Depondt, Boutersem (BE); Mathijs Sinnaeve, Tienen (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/988,903

(22) Filed: Nov. 17, 2022

(51) Int. Cl.
  *B60S 1/38* (2006.01)
  *H05B 3/14* (2006.01)
  *B60S 1/52* (2006.01)

(52) U.S. Cl.
  CPC .......... *B60S 1/3805* (2013.01); *B60S 1/3862* (2013.01); *B60S 1/3886* (2013.01); *H05B 3/146* (2013.01); *B60S 1/524* (2013.01)

(58) Field of Classification Search
  CPC .............................. B60S 1/3805; B60S 1/482
  See application file for complete search history.

(56) References Cited

U.S. PATENT DOCUMENTS

| | | | |
|---|---|---|---|
| 3,489,884 A | 1/1970 | Waseleski, Jr. | |
| 4,152,808 A * | 5/1979 | Andregg | B60S 1/3805 15/250.07 |
| 4,334,148 A | 6/1982 | Kampe | |
| 4,348,584 A | 9/1982 | Gale et al. | |
| 4,629,869 A | 12/1986 | Bronnvall | |
| 5,221,828 A | 6/1993 | Basheer et al. | |
| 5,325,561 A | 7/1994 | Kotlar | |
| 5,749,118 A | 5/1998 | Holland | |
| 6,591,443 B1 | 7/2003 | Gilpin | |
| 7,503,095 B2 * | 3/2009 | Lin | B60S 1/381 15/250.43 |
| 8,327,496 B2 * | 12/2012 | Kim | B60S 1/3805 15/250.07 |
| 2008/0000039 A1 | 1/2008 | Higgs | |
| 2008/0256738 A1 * | 10/2008 | Malone | B60S 1/3856 15/250.06 |
| 2009/0100626 A1 * | 4/2009 | Kim | B60S 1/3805 15/250.05 |
| 2012/0117746 A1 * | 5/2012 | Egner-Walter | B60S 1/3849 15/250.06 |
| 2014/0317873 A1 * | 10/2014 | Moll | B60S 1/3805 15/250.08 |
| 2015/0013092 A1 * | 1/2015 | Caillot | B60S 1/3805 219/535 |
| 2015/0239434 A1 * | 8/2015 | Caillot | B60S 1/524 15/250.07 |
| 2015/0239435 A1 * | 8/2015 | Caillot | B60S 1/3805 15/250.07 |
| 2017/0066410 A1 | 3/2017 | Jones | |
| 2017/0267215 A1 * | 9/2017 | Caillot | H05B 1/0236 |
| 2021/0046904 A1 * | 2/2021 | Depondt | B60S 1/40 |

FOREIGN PATENT DOCUMENTS

| | | |
|---|---|---|
| DE | 102020200342 A1 | 7/2021 |
| FR | 3090537 A1 | 6/2020 |
| FR | 3129338 A1 | 5/2023 |
| FR | 3129645 A1 | 6/2023 |

* cited by examiner

*Primary Examiner* — Michael D Jennings
(74) *Attorney, Agent, or Firm* — Michael Best & Friedrich LLP

(57) ABSTRACT

A wiper blade (10), in particular for a motor vehicle, is proposed. This comprises a wiping bar (12) and a heating element (32). According to the invention, the heating element (32) is self-regulating.

20 Claims, 4 Drawing Sheets

WIPER BLADE, IN PARTICULAR FOR A MOTOR VEHICLE

BACKGROUND OF THE INVENTION

The invention relates to a wiper blade, in particular for a motor vehicle.

Some wiper blades having a wiping strip and a heating element are already known.

For example, DE 10 2020 200 342 A1 shows a wiper blade in which a heating element is positioned in a wind deflector bar of the wiping bar.

SUMMARY OF THE INVENTION

The wiper blade according to the invention has the advantage that the heating element is self-regulating. Optimal and situationally adapted heating of the wiping strip is thereby achieved.

Advantageous further developments and improvements of the features specified in the main claim are possible as a result of the features listed in the subclaims.

It is particularly advantageous for the heating element to have a self-regulating semiconductor matrix, as it is simple, inexpensive and effective.

In this case, it is particularly advantageous for the semiconductor matrix to be arranged between two conductors, in particular copper conductors, because copper represents a very good electrical conductor and is highly corrosion-resistant as well.

Advantageously, at least one of the conductors, preferably both conductors, is nickel-plated. This further increases the corrosion resistance.

It is also particularly advantageous if the heating element comprises a polyolefin and/or a fluoropolymer jacket.

Furthermore, it is to be considered advantageous if the heating element is freely movable in the transverse direction. This further improves the self-regulating characteristic.

Furthermore, it is advantageous if the heating element is positioned insulated in the longitudinal direction at one end. This further improves the reliability of the heating.

It is particularly advantageous if an end cap is provided at both ends of the longitudinal extension of the wiper blade and the heating element is insulated in the longitudinal direction at the side of the end cap. Thus, the heating element can be easily put in contact with a conductor on the wiper arm.

It is of particular advantage in this case if the insulated end of the heating element is positioned in the end cap. This results in optimal heating of the wiping strip.

It is also advantageous if a fastening element for fastening to a wiper arm is provided between the end caps and a contact end of the heating element is positioned in the area of the fastening element. This allows for simple contacting of the heating element.

BRIEF DESCRIPTION OF THE DRAWINGS

One design example of the invention is shown in simplified form in the drawings and explained in more detail in the following description. The figures show.

DETAILED DESCRIPTION

Figure 1:
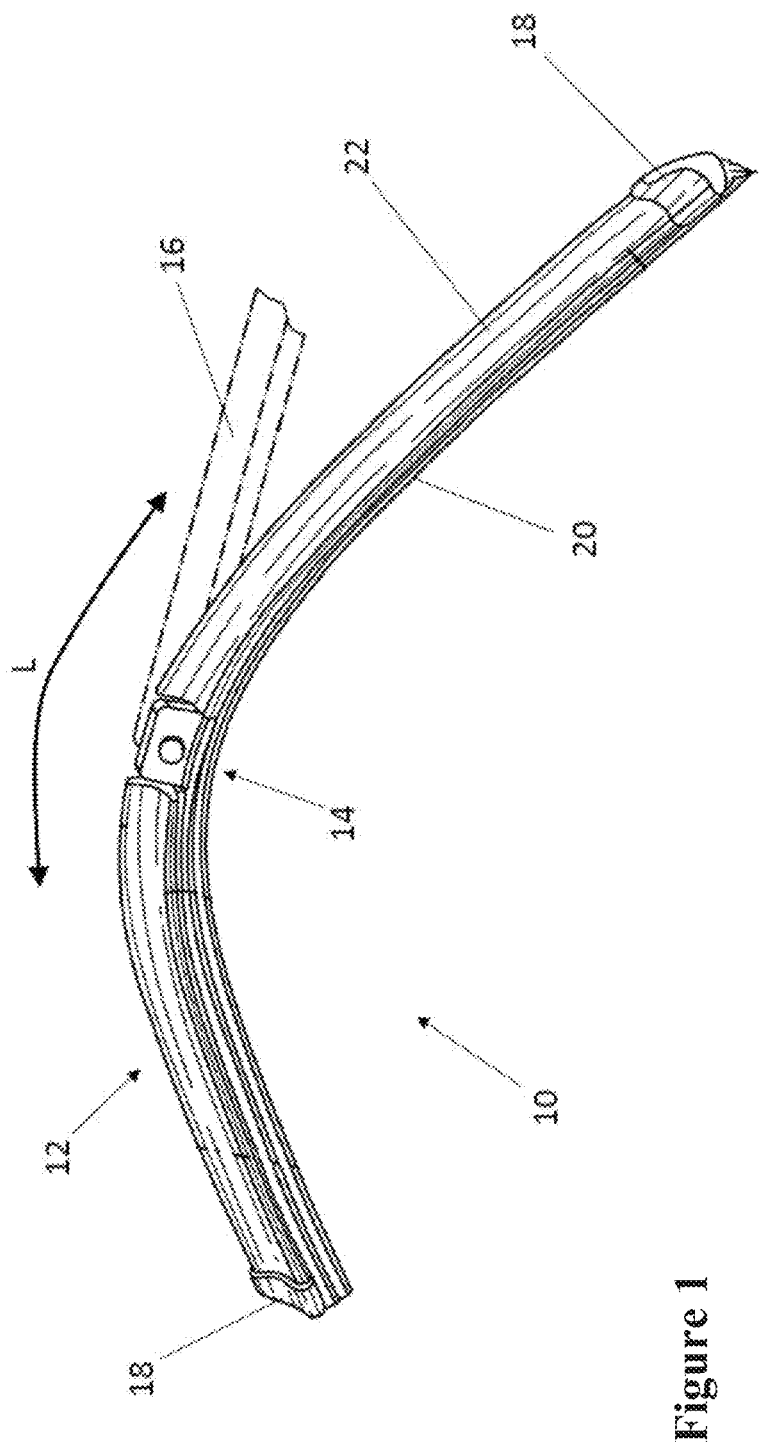
FIG. 1 a wiper blade according to the invention in a schematic, perspective illustration, FIG. 2 a cross-section through a wind deflection bar of a wiper blade according to the invention, FIG. 3 the cross-section of FIG. 2 with a heating element, FIG. 4 a schematic, perspective partial sectional view of a windshield bar.

In FIG. 1, a wiper blade 10 according to the invention is shown in a schematic perspective representation. This includes a wiping strip 12, as well as a fastening element 14 for fastening the wiping strip 12 to a non-invention wiper arm 16. The wiper blade 10 has a longitudinal extension L. At the ends with respect to the longitudinal extension L, each wiping strip 12 comprises an end cap 18 which closes the wiper blade 10 with respect to its longitudinal extension L. The wiping strip 12 has a wiper tip 20 on its lower surface, which is to be wiped in operation, which can remove moisture from the windshield. On its top side facing away from the windshield, the wiping strip 12 has a wind deflector bar 22 which is moved in operation from the wind of travel, thereby increasing the force with which the wiping strip 12 is pressed onto the windshield.

Figure 2:
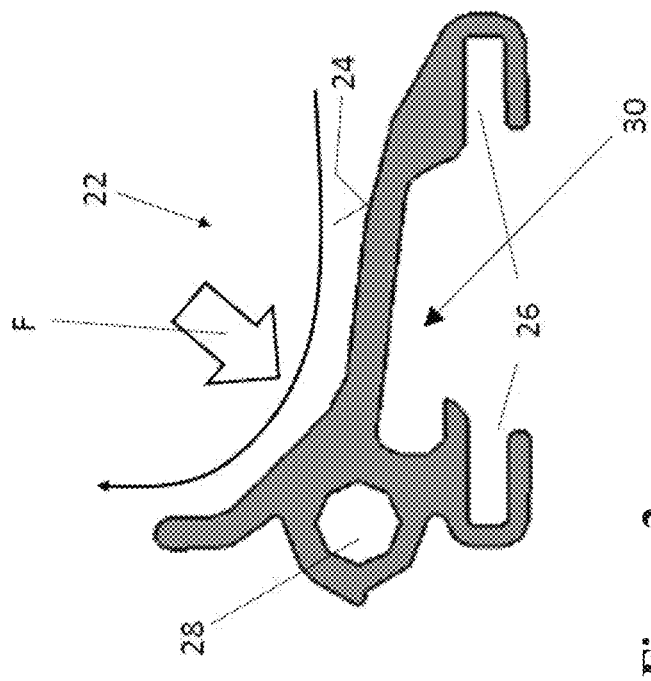
Figure 4:
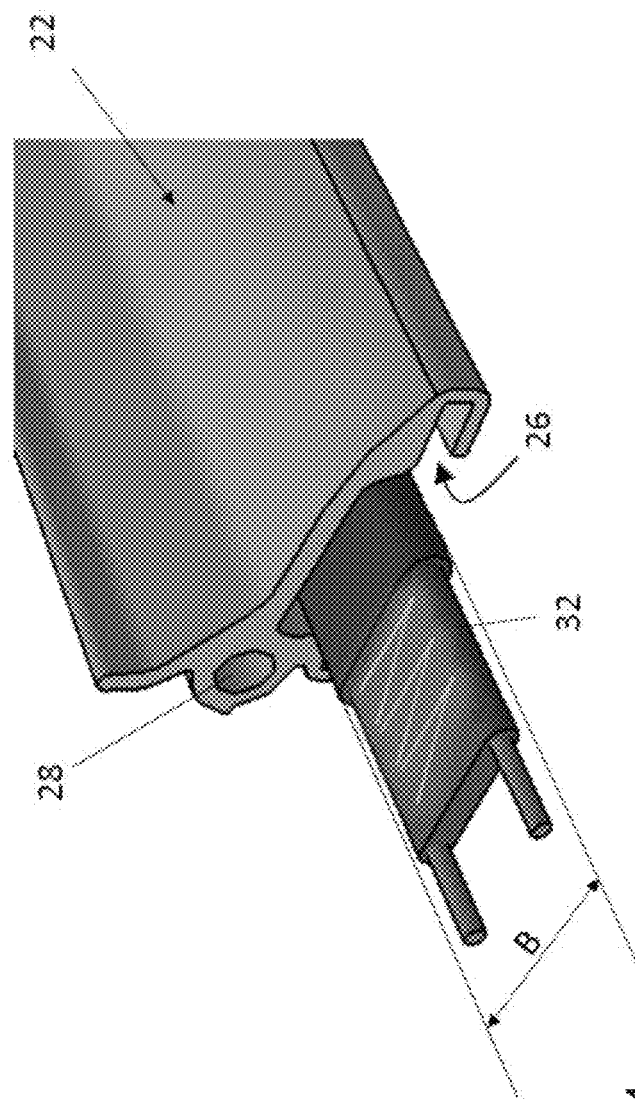

In FIG. 2, a cross-section is shown through the wind deflection bar 22 of the wiper blade 10 according to the invention. The wind deflector bar 22 comprises a spoiler surface 24, which is redirected towards the flowing wind of travel of the type, such that a force component F is produced downwardly, towards the wiper 20 (FIG. 1). The wind deflector bar 22 is fastened by mounting rails 26, which, for the sake of clarity, encompass spring rails that are not drawn here. On the side facing away from the wind of travel, the wind deflector bar 22 further comprises a channel 28, which is intended for supplying cleaning liquid to cleaning nozzles. The channel 28 may also itself comprise openings for the application of cleaning liquid.

The wind deflector bar 22 further comprises a receiving space 30 for receiving a self-regulating heating strip.

Figure 3:
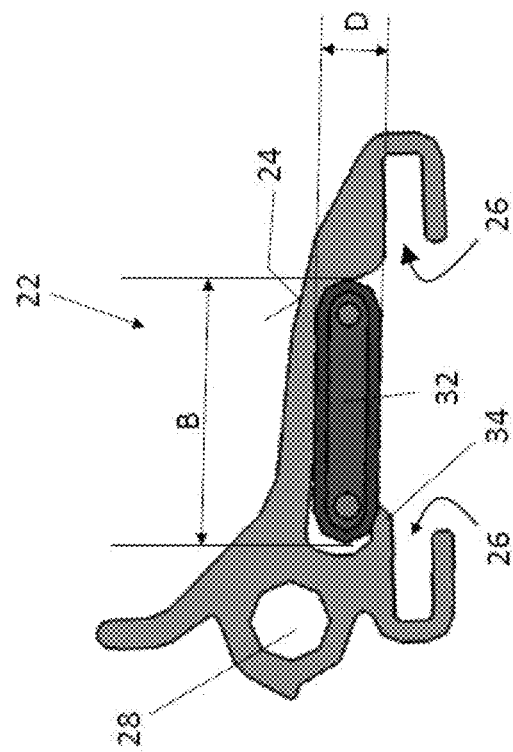

In FIG. 3, the same cross-section is shown through the wind deflection bar 22 of the wiper blade 10 according to the invention as in FIG. 2; however, a heating element 32 is inserted into the receiving space 30, which is configured as a self-regulating heating strip. By the way, FIG. 3 corresponds to FIG. 2, so that reference is made to the description of FIG. 2 in this respect. The heating element 32 is thus substantially positioned inside the wiping strip 12 and thereby from protected from environmental influences and wind of travel. The heating element 32 is elongated in cross-section and has a thickness D, which is about one quarter of its width B. For bracketing, a protrusion 34, on which the heating element 32 is supported, is arranged on the bottom side facing the mounting rails 26 at the receiving space 30. As shown here, protrusion 34 may be provided only on one side here of the rear side facing away from the wind of travel. However, in a variation of the invention, a further protrusion, alternatively or in addition, can also be arranged on the front side facing the wind of travel. The width of the receiving space 30 is slightly larger than the width B of the heating element 32 so that the heating element 32 is freely movable in the transverse direction and can expand somewhat in the transverse direction.

Figure 5:
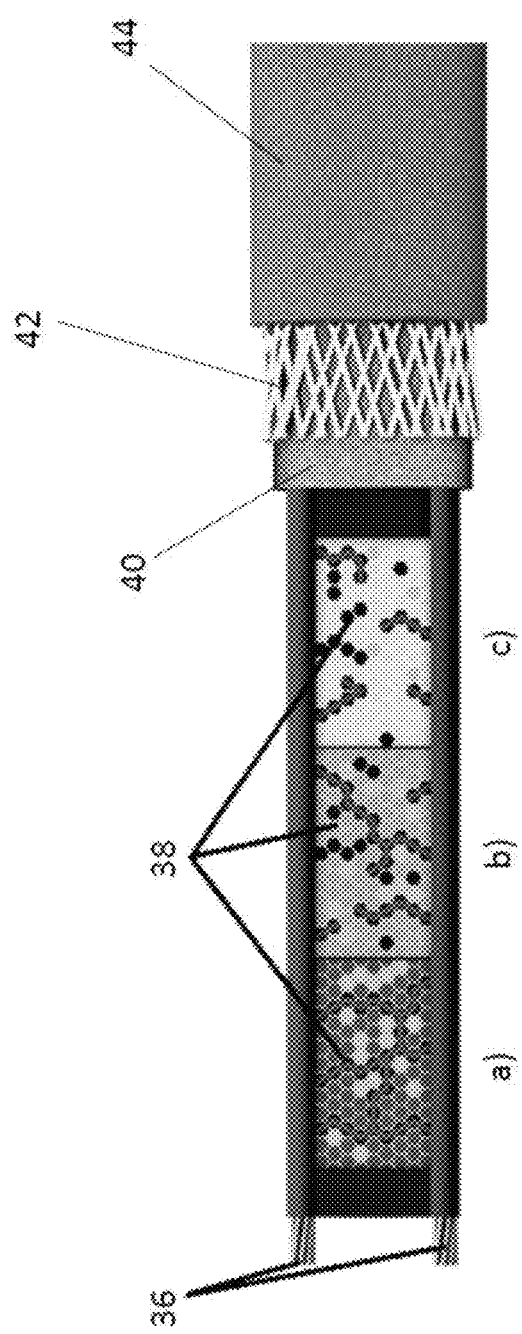
FIG. 5 a heating element of a wiper blade according to the invention.

FIG. 5 shows a heating element 32 of a wiper blade 10 according to the invention in a schematic partial section representation. A plastic is positioned between two nickel-plated copper leads as conductor 36, in which carbon particles are embedded so that a semiconductor matrix 38 is formed. When the temperature increases, the plastic expands and the carbon particles become more and more separated from each other, thereby interrupting the power paths and reducing heating power. In section a), the temperature is low and the heating power is maximum. In section b), the temperature is somewhat higher than in range a), thereby reducing the heating power. In section c), the temperature is still higher than in the range b) and thereby the heating power is reduced to a minimum, or equal to zero. Through this semiconductor matrix 38, the heating element 32 is self-regulating. The heating element 32 is surrounded by a fluoropolymer jacket 40, but a jacket of a modified polyolefin is also possible here. A braid 42 of tinned copper filaments is provided on this. The outer housing 44 extending over the braid 42 is made of fluoropolymer or a modified polyolefin.

According to the invention wiper blade 10 contains two heating elements 32 configured as heating cables. The one heating strip extends from the fastener 14 to an end cap 18. The other heating strip extends from the fastener 14 to the other end cap 18. In the fastener 14, the two heating cables of the heater 32 are contacted in which they are connected to an electrical lead. This end of the respective heating strip represents the contact end. The electrical lead passes through the wiper arm 16 to the fastener 14. The other end of the respective heating strip is insulated. For example, a suspending tube or a suspending cap may be used to shrink onto the cut-off end of the heating strip. This insulated end of the heating strip is positioned within the end cap 18. The insulation is therefore provided on the end cap side. In a variation of the invention, the end cap 18 can also be configured as sealing such that separate insulation of the end of the heating cable can be omitted. For this purpose, additional seal elements may be provided between the end cap 18 and the wind deflection bar 22.

In a further variation of the invention, the heating element 32, hence the heating strip, may also be contacted at one of the end caps 18. Here, the end cap 18 that is close to the wiper arm 16 is suitable. The heating strip can thus extend from one end cap 18 to the other end cap 18.

What is claimed is:

1. A wiper blade (10) comprising a wiping strip (12) and a heating element (32), characterized in that the heating element (32) is self-regulating, such that when a temperature of the heating element (32) increases, a heat power from the heating element (32) is configured to decrease, wherein the heating element (32) comprises a self-regulating semiconductor matrix (38), wherein the semiconductor matrix (38) includes a plurality of carbon particles embedded in a piece of plastic, and wherein the piece of plastic is configured to expand when heated, such that the carbon particles become separated apart farther from one another.

2. The wiper blade (10) according to claim 1, characterized in that the semiconductor matrix (38) is positioned between two conductors (36).

3. The wiper blade (10) according to claim 2, characterized in that at least one of the conductors (36) is nickel-plated.

4. The wiper blade (10) according to claim 2, characterized in that both of the conductors (36) are nickel-plated.

5. A wiper blade (10) according to claim 1, characterized in that the heating element (32) is surrounded by a polyolefin jacket (40).

6. A wiper blade (10) according to claim 5, characterized in that the heating element (32) is surrounded by a fluoropolymer jacket (40).

7. The wiper blade according to claim 5, wherein the polyolefin jacket (40) is surrounded by a braid (42) of tin copper filaments.

8. The wiper blade (10) according to claim 1, characterized in that the heating element (32) is freely movable in a transverse direction.

9. The wiper blade according to claim 8, wherein the wiping strip (12) extends along a longitudinal direction (L), and wherein the transverse direction is perpendicular to the longitudinal direction (L).

10. The wiper blade according to claim 9, wherein the wiping strip (12) includes a wiper tip (20) on a lower surface and a wind deflector bar (22) on a top side, wherein the wind deflector bar (22) includes a receiving space (30) for receiving the heating element (32), wherein the receiving space (30) has a width that is greater than a width of the heating element (32).

11. The wiper blade (10) according to claim 1, characterized in that the heating element (32) is positioned insulated in a longitudinal direction (L) at one end.

12. The wiper blade (10), according to claim 1, characterized in that an end cap (18) is provided at both ends of a longitudinal extension of the wiper blade (10) and the heating element (32) is insulated in a longitudinal direction (L) at an end cap-side end.

13. The wiper blade (10) according to claim 12, characterized in that the insulated end of the heating element (32) is positioned in the end cap (18).

14. The wiper blade (10) according to claim 12, characterized in that between the end caps (18) a fastener (14) is configured for attachment to a wiper arm and a contact end of the heating element (32) is positioned in an area of the fastener (14).

15. The wiper blade (10) according to claim 1, characterized in that the semiconductor matrix (38) is positioned between two copper conductors (36).

16. A wiper blade (10) according to claim 1, characterized in that the heating element (32) is surrounded by a fluoropolymer jacket (40).

17. The wiper blade according to claim 16, wherein the fluoropolymer jacket (40) is surrounded by a braid (42) of tin copper filaments.

18. The wiper blade (10) according to claim 1, wherein the semiconductor matrix (38) includes two nickel-plated copper leads, wherein the plastic piece is positioned between the two nickel-plated copper leads.

19. A wiper blade (10) comprising a wiping strip (12) and a heating element (32), characterized in that the heating element (32) is self-regulating, such that when a temperature of the heating element (32) increases, a heat power from the heating element (32) is configured to decrease, wherein an end cap (18) is provided at both ends of a longitudinal extension of the wiper blade (10) and the heating element (32) is insulated in a longitudinal direction (L) at an end cap-side end.

20. A wiper blade (10) comprising a wiping strip (12) and a heating element (32), characterized in that the heating element (32) is self-regulating, such that when a temperature of the heating element (32) increases, a heat power from the heating element (32) is configured to decrease, wherein the heating element (32) is surrounded by a polyolefin jacket (40) or a fluoropolymer jacket (40), and wherein the polyolefin jacket (40) or the fluoropolymer jacket (40) is surrounded by a braid (42) of tin copper filaments.

* * * * *